March 10, 1925.  J. M. GOODWIN  1,529,125
COLOR CHART AND SCALE
Filed Oct. 19, 1923  2 Sheets-Sheet 1

Inventor
John M. Goodwin
By Lancaster Allwine
Attorneys

March 10, 1925.  
J. M. GOODWIN  
COLOR CHART AND SCALE  
Filed Oct. 19, 1923

Inventor  
John M. Goodwin.  
By Lancaster Allwine  
Attorneys

Patented Mar. 10, 1925.

1,529,125

UNITED STATES PATENT OFFICE.

JOHN M. GOODWIN, OF WASHINGTON, DISTRICT OF COLUMBIA, ASSIGNOR OF ONE-HALF TO GEORGE S. FRASER, OF WASHINGTON, DISTRICT OF COLUMBIA.

COLOR CHART AND SCALE.

Application filed October 19, 1923. Serial No. 669,608.

*To all whom it may concern:*

Be it known that I, JOHN M. GOODWIN, a citizen of the United States, residing at Washington, in the District of Columbia, have invented certain new and useful Improvements in Color Charts and Scales, of which the following is a specification.

This invention relates to a device for correctly determining the relation and values of colors.

The primary object of this invention is the provision of a scientifically correct color chart or scale, by means of which a user may determine the harmonic relation of colors in a simple and expeditious manner, and the proportionate values of the colors necessary to produce a color scheme or harmonious effect.

A further object of this invention is the provision of a color chart which will automatically indicate the exact quantities of pigment to be used in order to give any desired compound color.

A further object of this invention is the provision of a color chart of the above described character, which will automatically indicate the various colors which may be associated with a predetermined color to give a harmonic color scheme.

A further object of this invention is the provision of a color chart having various colors depicted thereon, and means associated therewith to determine the colors and proportions of colors to be used in order to produce a harmonic scheme; a harmonizing neutral grey; or an acromatic mixture.

A further object of this invention is the provision of a color chart having various colors so arranged thereon so as to indicate the colors of shadows which will be cast by obstructing rays of light of a predetermined color; which indicates the color to be used in order to produce cool of warm effects in a color scheme; and which also indicates the colors which may be used in order to produce the psychological effect of advancing or receding.

A further object of this invention is the provision of a color chart of the above mentioned character by means of which a user may at a glance determine contrasting colors; complementary colors; reciprocal contrasts; melodizing combinations; metrochrome values, monochromatic color schemes; harmonics in hues; values of colors; and neutralizing colors.

Other objects and advantages of this invention will be apparent during the course of the following detailed description.

In the accompanying drawings, forming a part of this specification, and wherein similar reference characters designate corresponding parts throughout the several views.

Figures 1, 2:
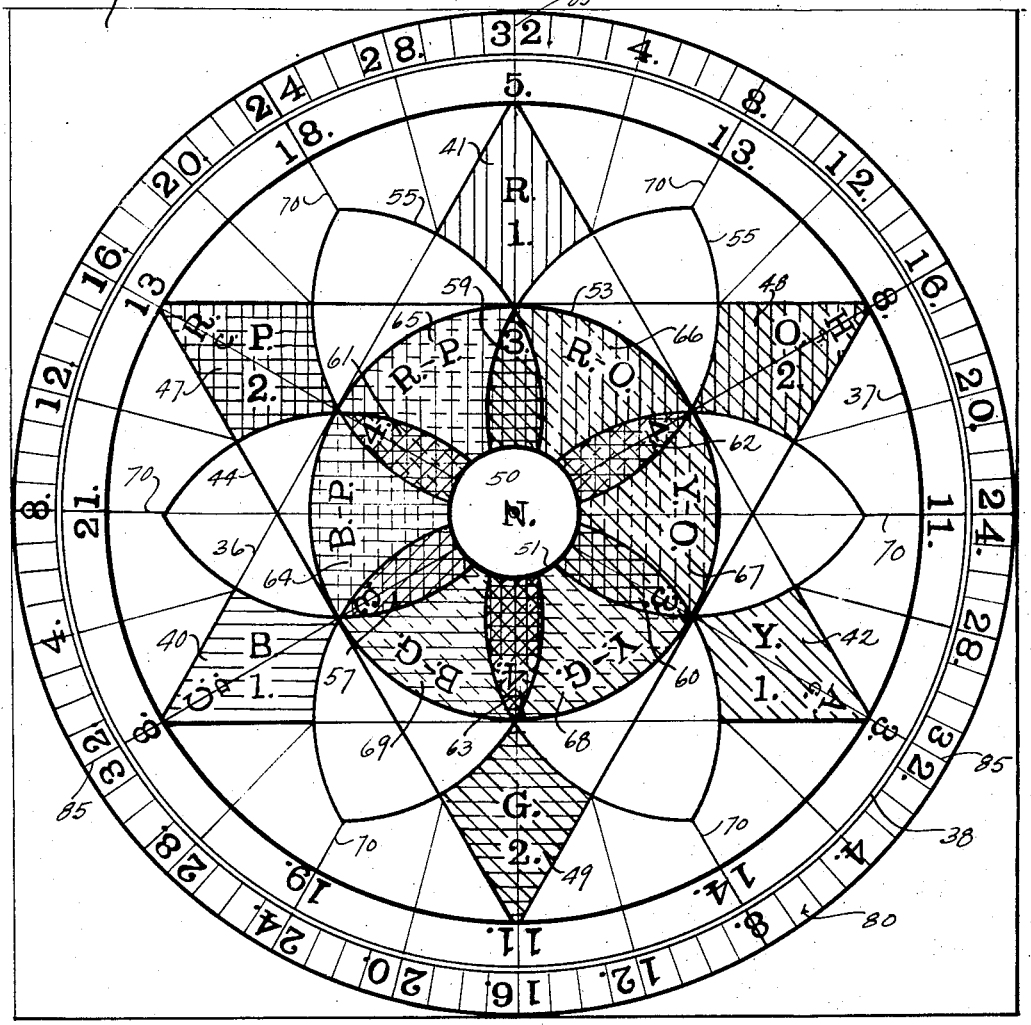
Figure 1 is a plan view of the preferred arrangement of the color chart.
Fig. 2 is a cross sectional view taken through the chart illustrated in Figure 1.

In order to more thoroughly comprehend the scope of the invention and to permit a thorough understanding of the same it is necessary to briefly define certain terminology as used in this specification according to the meaning ascribed by color analysts in their scientific color nomenclature, and to refer to certain little known psychological phenomena relating to colors.

By a primary color is meant a color that is first in order of development. The three primary colors referred to on the improved chart are the pigment expression of solar spectrum colors, in their full intensity and normal strength. These primary colors are red, blue, and yellow, and in their pigment colors are impossible of separation into any other hue. Any two primary colors mixed will produce a secondary color. Any two secondary colors mixed will produce a tertiary color. Any two tertiary colors mixed will produce a quaternary color. By a secondary compound color is meant any color which results from mixing a secondary color with a primary color.

By metrochrome values is meant the color measurement value of a hue as ascertained by the metrochrome scale. The metrochrome scale is based on the color values as demonstrated by the metrochrome instrument. The metrochrome instrument, as known to those experienced in the art to which this invention relates, is a graduated series of the three primary pigment color scales, so arranged as to render the reciprocal contrasts, chromatic equivalents and numerical equivalents of any combination of colors.

By the term acromatic mixture, is meant a mixture of colored fluids in such proportions as will result in a colorless mixture. If we speak of a solution of liquid cobalt, a liquid red-gold, and a liquid yellow silver blended in the proportions ascribed to them in the metrochrome color scale, that is, cobalt, eight parts, red gold, five parts, and yellow silver, three parts, then we will find that these three colored liquids when blended in the given proportons will result in an acromatic mixture, or in other words, a mixture which has been completely neutralized in color, and which is therefore colorless. A mixture, in the proportions given, of white light is similar, that is, eight parts of white light give blue light rays, five parts of white light give red light rays, and three parts of white light give yellow light rays. The blending of these obtained light rays in the proportion of eight parts of blue light rays, with five parts of red light rays, and three parts of yellow light rays will give white light. If a ray of white light is separated into its component parts by passing it through a prism, the primary colors will be found to be blue eight parts, red five parts, and yellow three parts. Where blue overlaps yellow the hue becomes green, where yellow overlaps red, the hue becomes orange, where red overlaps blue the hue becomes purple.

The three primary colors in solar spectrum rays and in pigment spectrum colors resulting from the reflection and absorption of white light rays are found to be the same colors, that is, there are in both cases;—blue, red, and yellow.

The same relative proportions exist between all hues of the spectrum color and all hues of pigment colors, because pigment colors derive every variety of their hue from the different degree in which they reflect or absorb the white light rays. With this explanation it can be seen that when certain colored fluids, or rays of colored light are blended in given proportions they will produce an acromatic or colorless mixture. This holds true in the production of dyes, chemicals, stained glass, ceramics, glass, and other such operations where a scientific knowledge of color is of great value.

No colored pigment is entirely transparent, therefore, no pigment mixtures are acromatic. If the colors and proportions are selected that will produce an acromatic mixture in ffuids, these same colors and proportions will produce a neutral gray pigment mixture, and if the same colors and proportions in area are employed in a color scheme the result will be a harmonic color scheme, or in other words it will be a color scheme with a harmonious or neutralizing effect.

In order to determine the color of any shadow cast by any given colored light source, it is necessary to project the predetermined color light onto a white intercepting surface upon which is diffused white light. This intercepting surface may be referred to as the screen. Under these circumstances any colored light ray projected upon the white surface of the screen will cast a light of the same color as the colored ray. If now an opaque object is placed in a position between the colored light source and the screen so that it will intercept the colored light rays, there will appear upon the screen a shadow of the form of the opaque object. This shadow will be a color which is the complement of the projected color light ray. The explanation for this simple but comparatively little known phenomenon is that a ray of white light contains blue, red, and yellow light rays, and an opaque object cutting off all of these colored light rays will cast a shadow without color upon a surface where diffused light is reflected. If in place of the white light source there is substituted a blue light source then any opaque object placed between the blue light source and the white surface screen will create a shadow by cutting out the projected blue light rays in silhouette of the opaque body. This silhouette shadow will be the complementary color of the projected light rays, or in other words will be the color which has not been cut out from the white light by the interposed opaque object. Of the primary colors since the blue light has now been cut out yellow rays and red rays remain, and combined they produce an orange colored silhouetted shadow which is the complement of the blue light.

There is warmth in all light. Rays of light of different color, however, differ in degrees of warmth, and orange rays of light are the hottest rays in color, whereas blue rays are the coldest rays in color. In pigment, colors present the psychological effects of warmth or coldness according to the proportion of orange or blue which they include.

By psychological effects of advancing or receding which different colors give is meant the systematic functioning of the mind, whereby the impression on the semsorium created by a color that absorbs the bulk of the light rays, records such colored objects as being at a greater distance from the observer than an object similarly located that is of a color which reflects the bulk of the light rays. A color that absorbs the bulk of the light rays is a transparent shadow color on the shadow side of the hereinafter described chart and has the effect of retreating or receding. Purple is the most receding color and is nearest in approach to black. It absorbs more light than any other color. Yellow on the other hand is the most advancing color and it is the color which nearest approaches white and it is opaque in contra-distinction to the transparent purple. It reflects more light than any other color. Another permanent requirement relating to the advancing or retreating quality of the colors chosen, is determined by the location of the selected colors respectively.

The hereinafter described chart is divided into two sections, for the purpose of selecting advancing or retreating colors, by a diametrically extending line half-way between the yellow area and the purple area. All hues lying on the side of the yellow color are more or less advancing in effect according to their position with respect to the yellow colors area. All hues lying on the side of the chart on which the purple color is depicted are more or less retreating in effect according to their position with respect to the purple colored area.

By contrasting colors is meant colors that lie diametrically opposed to each other, on opposite sides of the center point of the chart to be hereinafter described. These colors to be contrasting do not necessarily have to be used in the neutralizing proportions indicated on the metrochrome scale.

Complementary colors are any two colors that when blended in proportion as indicated on the metrochrome scale will produce an acromatic liquid, a neutral gray pigment blend, or a neutralized surface color composition.

By reciprocal contrasts is meant colors that are mutually interchangeable, and which represent extremes in contrasted values, powers, and effect.

Melodizing combinations are produced by using colors that harmonize through bearing resemblance to each other, owing to the fact that one of the combined colors contains some proportion of the other color.

A monochromatic color scheme is one in which one hue is employed in combination with its tint, tone, and shade, and accented by its complement. By the term accent is meant giving sparkle or life. An example of a monochromatic color scheme would be that of yellow in all its shades and tints, accented by its complement purple.

By harmonics in hues is meant the combination of three hues in fixed proportions as will produce a harmonious or neutralizing effect if spread in surface area; or if blended in pigment will produce a neutral gray mixture that will harmonize with the color scheme made up of the three selected harmonic surface hues.

Figure 3:
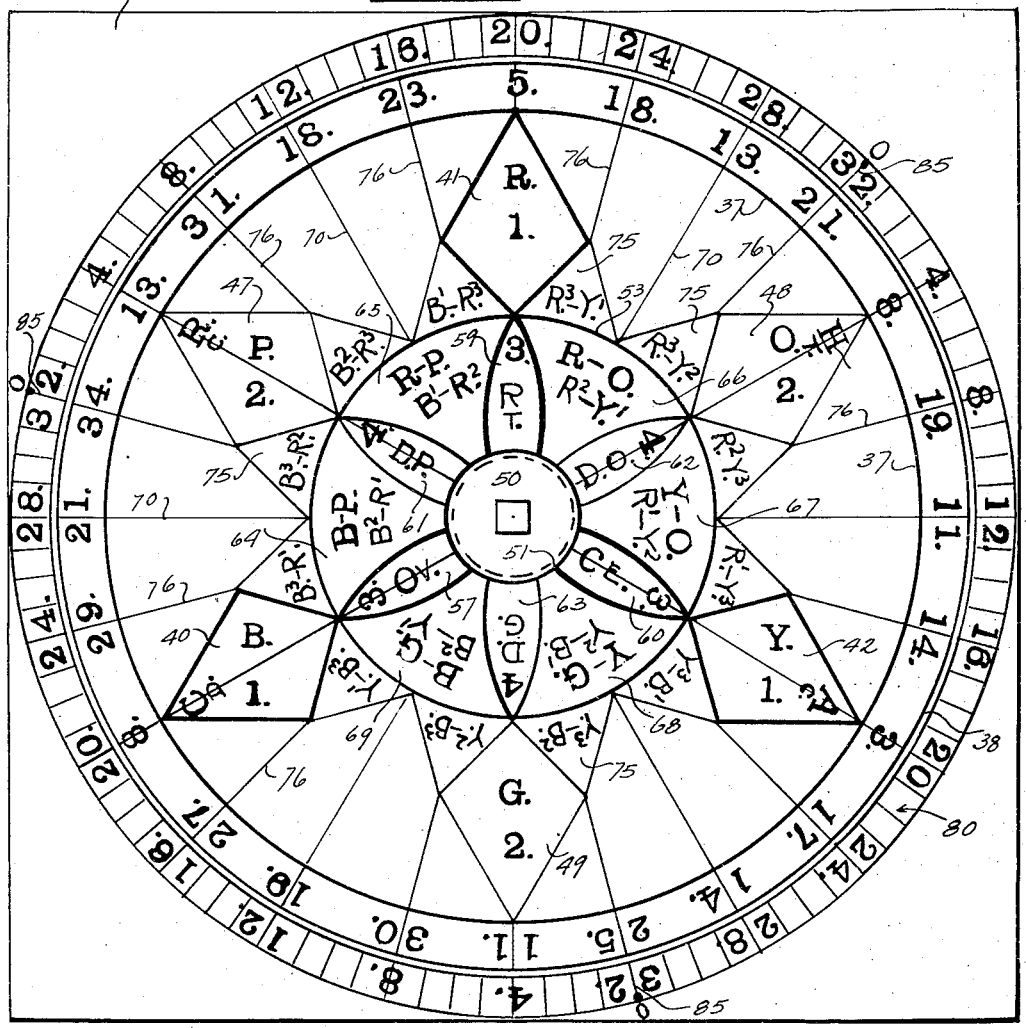
Fig. 3 is a plan view of a color chart embodying the fundamental principles of this invention, showing by way of example the harmonic colors of a compound color scheme.

In the drawings, wherein for purposes of illustration are shown the forms of this invention the letters A and B may respectively designate the forms of invention illustrated in Figures 1 and 3 of the drawings, each of which includes the member 35 which may be circular in formation. Each of the discs 35 for the forms A and B has depicted thereon a triangle 36, preferably equilateral. An outer circle 37 is preferably concentrically arranged upon the face of the disc 35, just inwardly from the outer periphery 38 of said disc, and into which circle the points of the triangle 36 extend. In the apices of the triangle 36 the primary colors blue, red, and yellow are placed, as at 40, 41 and 42 respectively, preferably in the same intensity which they appear in the solar spectrum. These primary colors are thus triadically arranged on the disc 35.

A second equilateral triangle 44 is preferably disposed on the face of the disc 35, of the same dimensions as the triangle 36 above mentioned, and in a reversed overlying relation therewith. The points of the triangle 44 extend to the scribed circle 37; said points being equidistant from adjacent points of the triangle 36. In the apices of the triangle 44 it is preferred to place the secondary colors, namely: purple, orange, and green. These secondary colors which are respectively designated by numerals 47, 48 and 49 on the triangle 44 are cooperatively disposed in associated and alternate relation with the primary colors 40, 41 and 42, and they appear in the intensity in which they appear in the solar spectrum.

It is preferred to provide a central area 50 on the chart 35, preferably by scribing a circle 51 concentric with the center of the disc 35, and within which area may be placed the neutral product of a mixture of harmonic colors, such as neutral grey. This area, 50, however, represents the neutral product resulting from the blending of any two diametrically opposed colors which appear on the face of the chart disc 35, according to their metrochrome scale values. Thus, purple in the proportion of 13 units mixed with yellow in the proportion of 3 units, in pigment, will blend into neutral gray. These two colors in this same proportion are therefore complements, and if used in these same proportional surface areas they will produce a neutralizing color.

composition, or in other words they will make a harmonious color scheme for the reason that these colors neutralize each other.

Within that area in which the triangles 36 and 44 overlap, it is preferred to scribe a circle 53, concentric with the circles 37 and 51, which is arranged tangentially with the sides of the triangles 36 and 44, and within the area between which circles 51 and 53 it is preferred to place colors such as secondary compounds, tertiaries, and quaternaries, as will now be described.

Circles or arcs of circles are preferably scribed on the face of the disc 35, which extend through the area between the scribed concentric circles 51 and 53, and preferably into the area on the disc outside of the circle 53, as is illustrated in Figure 1 of the drawings. These arcs or circles 55 are preferably six in number, with their centers disposed in equi-spaced relation upon the circumference of the circle 53; the radii of said circles 55 being equal to the radii of the circle 53. It is thus obvious that portions of adjacent circles or arcs will overlap to provide a substantially star shaped arrangement within the area on the disc between circles 51 and 53. These overlapping areas are, of course, six in number, with opposed overlapping areas in diametric alignment with each other and with the diametrically opposed primary and secondary color areas above mentioned. The area 57 formed by the overlapping of circles or arcs 55 adjacent the area 40 within which the blue color is depicted, has the tertiary color olive depicted therein, and which is equi-distantly positioned from the secondary color areas 47 and 49 respectively designated purple and green. A second area 59, which is placed adjacent the red color area 41, has the tertiary color russet depicted therein; said russset color being disposed in said area 59 equi-distant between the secondary color areas 47 and 48, which depict respectively purple and orange. A third area 60 is arranged within the circle 53 adjacent the primary color yellow, which has depicted therein the tertiary color citrine, which is equi-distantly placed between the secondary color areas 48 and 49, which respectively designate orange and green. The remaining overlapping areas 61, 62 and 63 formed by the overlapping of the circles 55 are alternately arranged with respect to the equi-distant areas 57, 59 and 60 within which the tertiary colors are disposed; said areas 61, 62 and 63 being respectively disposed adjacent the areas 47, 48 and 49 of the secondary colors, and which have depicted therein quaternary colors. The quaternary color in the area 61 is that of dark purple, which is of course the product of a mixture of the colors depicted in the adjacent tertiary areas 57 and 59, namely, olive and russet. Similarly the quaternary area 62 has depicted therein dark orange, which is the product of a mixture of the tertiary colors russet and citrine which are disposed in the adjacent areas 59 and 60 respectively. Likewise, the quaternary area 63 has the color dark green depicted therein, which is the resultant of the mixture of the tertiary colors citrine and olive which are respectively depicted in the adjacent tertiary areas 60 and 57.

This color chart is essentially a pigment spectrum chart, and all color mixtures mentioned and described pertain to pigments unless otherwise specified. Wherever projected light rays are mentioned it is understood to mean rays of either color light or white light as the case may be.

In the spaces within the circle 53, between the tertiary and quaternary areas it is preferred to depict the secondary compounds which are the resultants of mixtures of primary and secondary colors, as can well be understood. Thus, in the area 64 between the tertiary olive and the quaternary color dark purple it is preferred to depict a blue-purple color, which is of course disposed between the primary and secondary colors blue and purple. In the area 65 between the quaternary color dark purple and the tertiary color russet is depicted a red-purple color; in the area 66 between the tertiary and quaternary colors russet and dark orange is depicted the secondary compound color red-orange; in the area 67 between the quaternary and tertiary colors dark orange and citrine is depicted the secondary compound color yellow-orange; in the area 68 between the tertiary and quaternary colors citrine and dark green is depicted the secondary compound color yellow-green; and in the area 69 between the quaternary and tertiary dark green and olive is depicted a blue-green secondary compound color.

In the area between the outer circle 37 and the periphery 38 of the disc 35 it is preferred to place a metrochrome color proportion scale. For the primary colors blue, red and yellow the numerical values 8, 5 and 3 respectively are placed in said area adjacent the points where the apices of the triange 36 engage the circle 37. These hues when blended in the proportions of the metrochrome scale will produce neutral gray in pigment, a colorless fluid mixture, and white light in light rays, and when used in surface areas in these values the colors will produce a harmonic color scheme; but these three primary colors in their full intensity, are an exception to the harmony rule, as they are the only three harmonics that are not in perfect harmony. This for the reason that there is no portion of any other color in any one of these colors. Similarly, for the secondary colors purple, orange, and green, their respective metrochrome color values 13, 8 and 11 are disposed adjacent the points where the triangle 44 engages the circle 37. The two equilateral triangles 36 and 44 together form a six pointed star and the relationship of the metrochrome scale numbers placed at the six points of the same is such that the sum of the two numbers at diametrically opposed points of the star is always equal to 16. Moreover, the sum of any two diametrically opposed numbers of this metrochrome scale, which are situated midway between the points of the six-pointed star is always equal to 32. Furthermore, the metrochrome scale number of any one of the three secondary colors, such as orange, green or purple is always the sum of the scale numbers of its two primary colors. Thus, for orange it is the sum of red 5, and yellow 3, which equals 8, and for the color midway between any two points of the six pointed star it is the sum of the scale numbers found at those points. As is designated on the charts illustrated in Figures 1 and 3 of the drawings the secondary compounds are also represented by their respective metrochrome color values; it being preferred to radially extend lines 70 from the areas of the secondary compound colors to the metrochrome scale; these lines 70, of course, intersecting the metrochrome scale at points midway between the areas of the primary and secondary colors from which the secondary compounds are derived, as is aptly illustrated in the drawings. If desired, the tertiary and quaternary colors may also be given designated numerical values on the metrochrome scale, as well as any intermediary colors. For practical purposes, however, it is thought sufficient to give merely primary, secondary, and secondary compound colors their metrochrome values, and the values of the other intermediary colors can readily be ascertained by interpolation. It will be well understood by anyone skilled in the art to which this invention relates that the metrochrome values designate the relative proportions of said colors. Thus, by way of example, if it is desired to obtain an orange color of full intensity it is necessary to mix five parts of the primary color red, as indicated by the metrochrome scale, with three parts of the primary color yellow, as also indicated by the metrochrome scale, and which will give an orange color. If these parts of primary colors represent quarts, there will then be eight quarts of orange coloring or pigment. If it is desired to produce a red-orange pigment it is necessary to mix five parts of the primary color red with the designated eight parts of the secondary color orange, which will give thirteen parts of the secondary compound color red orange, as is designated in the chart.

Referring to Figure 3 of the drawings, wherein the color areas of the charts are designated by the first letters of the colors which they represent, it will be noted that certain of the color areas, such as the secondary compound colors, have been designated in terms of primary colors, with exponents attached to the letters designating the primary colors which must be multiplied with the numerical values of the metrochrome scale to determine the quantity of the product resulting from a combination of said primary colors. Thus, red-orange, a secondary compound color is designated by $R^2-Y^1$. The exponents of these primary colors are multipliers for the metrochrome values of the primary colors. Thus, since red has the scale number 5, $R^2$ is 10, and yellow is 3, therefore the colors $R^2 Y^1$ have the metrochrome scale number 13 as shown on the chart. This chart also shows the sub-division of areas outside of the circle 53 into areas 75, see Fig 3, wherein may be positioned colors graded between the secondary compound colors and adjacent primary colors, as indicated by the exponents used with the primary colors. From these areas 75 radial lines 76 may extend to the metrochrome scale, and the metrochrome values of such colors may be placed in the area outside of the circle 37 to designate the value or quantity of such colors depicted in the area 75, and as is illustrated in Figure 3 of the drawings. Thus, in the triangle to the right of the red area 1 marked R, the legend $R^3-Y^1$ and the line running to the figure 18 on the metrochrome scale indicates that 3 parts of the red of primary color intensity is used with one part of yellow of primary color intensity. The 3 of the red is the multiplier for the red metrochrome value 5. In the metrochrome scale this compound therefore includes a mixture of 15 units of red to 3 units of yellow and has a metrochrome value of 18. The chart may thus be graded in this manner to infinity, or as closely as necessary thereto for practical purposes.

The following table designating the metrochrome values and total metrochrome values of the primary, secondary, and tertiary colors, and as given designate in what proportion the colors may be combined to form a neutral product which may be depicted in the area 50.

*Primary colors.*

|  | Blue | Red | Yellow |  |
|---|---|---|---|---|
| Metrochrome values. | 8 | 5 | 3 | Neutral grey in pigment or white in the metrochrome. |

*Secondary colors.*

|  | Blue | Red | Yellow |  |
|---|---|---|---|---|
| Orange | 0 | 5 | 3 |  |
| Green | 8 | 0 | 3 |  |
| Purple | 8 | 5 | 0 |  |
| Total | 16 | 10 | 6 | Neutral grey. |

*Tertiary colors.*

|  | Blue | Red | Yellow | Blue | Red | Yellow |  |
|---|---|---|---|---|---|---|---|
| Orange | 0 | 5 | 3 | } 8 | 5 | 6 | Citrine. |
| Green | 8 | 0 | 3 | | | | |
| Orange | 0 | 5 | 3 | } 8 | 10 | 3 | Russet. |
| Purple | 8 | 5 | 0 | | | | |
| Green | 8 | 0 | 3 | } 16 | 5 | 3 | Olive. |
| Purple | 8 | 5 | 0 | | | | |
| Total |  |  |  | 32 | 20 | 12 | Neutral black. |

The foregoing table designates the metrochrome values of all color mixtures, beginning with the mixture of the primaries in the ratio of 8-5-3; of blue, red and yellow consecutively, and in which proportion these colors compensate or neutralize each other equivalently. As shown by this table the amounts of the primary colors which constitute the secondary colors are proportionately blue 16—red 10—yellow 6. The proportions of the primary colors which constitute the tertiaries are blue 32—red 20—yellow 12. These secondary and tertiary colors reduced in the metrochrome scale to the primary colors are in the ratio of 8-5-3.

In this table it can be seen that the sum of the primary ratio blue 8—red 5—yellow 6—equals 16. Therefore, the sum of any two primary complements will equal 16, bearing in mind of course, that complementary colors are diametrically opposed to each other on the chart. An example of this is that of purple 13 with primary yellow 3 equals 16. Likewise green 11 with its complement red 5 equals 16, and in similar manner orange 8 with its complement blue 8 equals 16. Any two complementary colored pigments mixed will produce a neutral grey mixture.

Any two secondary colored pigments when mixed will produce a tertiary colored mixture. Example:—purple having a total metrochrome value of blue 8 and red 5 which equals 13, added to orange which has a metrochrome value of red 5 and yellow 3 will produce a pigment mixture of a russet color.

Any two tertiary colored pigments when mixed will produce a quaternary colored pigment mixture, and as an example may be given russet with a total metrochrome value of 21, added to olive with a total metrochrome value of 24 equals the quaternary color plum or dark purple having a metrochrome value of 45.

All tints of every hue may be produced by adding lighter hues, or by adding white pigment. All shades of every hue may be produced by adding darker hues, or by adding black pigment.

In order to produce a harmonious color scheme it is vitally necessary to use an exact proportion of the primary colors, whose resulting product will be a neutral grey. Thus, it is necessary that in any color scheme, the colors reduced to metrochrome values of the primary colors will give a proportion of the primary colors which will produce a neutral grey, namely a pigment mixture blended in the ratio of blue 8—red 5—yellow 3; and any multiple of this ratio. Thus, the color charts will ascertain with scientific accuracy the correctness of any color scheme, and determine whether the scheme is in fact, harmonic. If we mix two secondary colors, such as green and purple, their total metrochrome values in primary colors is equivalent to sixteen parts of blue, five parts of red, and three parts of yellow. As this proportion of primary colors is not as above mentioned, it will not produce a neutral grey, but will produce an olive color, as can be seen from the table above given. However, if we supply the lacking parts of the red and yellow primary colors, which are 5 and 3 respectively, the proportion of primary colors will then be blue 16 parts, red 10 parts, and yellow 6 parts, which is in the proportion above specified to provide a neutral grey.

The following examples are given to show that colors on diametrically opposed sides of the neutral color area 50 are contrasts and complements of each other.

If we add to the blue 16, red 5, yellow 3, which are the constituents of olive the red 5, yellow 3, which constitute orange, they amount to blue 16, red 10, yellow 6, which constitute the neutral grey, accordingly orange is the contrast and complementary of olive. So if we add to blue 8, red 10, yellow 3, which are the constituents of russet, the blue 8, yellow 3 of green, we again obtain the blue 16, red 10, yellow 6 of grey; and green is the contrast of russet; and if we add to the blue 8, red 5, yellow 6 of citrine the blue 8, red 5, of purple, we also obtain blue 16, red 10, yellow 6 of grey; and purple is the contrast of citrine.

Referring further to a novel and very important feature of this invention, it is preferred to provide a scale 80 in connection with the color chart, which for practical purposes may be referred to as a harmonic scale, and the purpose of which is to automatically indicate the colors which harmonize with any predetermined color to produce a compound color mixture with scientific accuracy. This harmonic scale is triadically sub-divided. It is disposed in concentric relation outwardly of the scale containing the metrochrome values, by any approved construction, several of which will be subsequently described. This harmonic scale has three points 85 thereon, which are equidistant about the annular harmonic scale 80, and which may be represented by zero mark, or by the numeral 32. This sub-divides the annular scale 80 into three parts, each of which parts may be sub-divided into thirty-two equal spaces. For practical working purposes the three points 85 are all that are necessary to determine the colors which are harmonically related to any predetermined color. By way of example, in Figure 3 of the drawings, the harmonic scale 80 has been shifted so that one point 85 thereof designates a color area 75 on the disc 35; this color being represented by the primary color proportions $R^3$—$Y^2$, and the numerical value 21 on the metrochrome scale; said color being produced by mixing 15 parts of red to six parts of yellow. These proportions are obtained by taking the metrochrome values of the red and yellow colors and multiplying them by their respective exponents. Thus, the metrochrome value of red is 5 and by multiplying it by its exponent 3 we obtain 15. In similar manner the metrochrome value of yellow is 3 and by multiplying it by its exponent 2 we have 6. As it is now desired to find the colors to which this predetermined color is harmoniously related, by following about the harmonic scale to the other points 85, a user can readily discern the color areas 75 in which the harmoniously related colors are depicted. One of these color areas harmoniously related to the predetermined color, in the terms of primary colors is $Y^3$—$B^2$, which is the resultant of a mixture of nine parts of yellow with sixteen of blue, thus giving a numerical value of 25, which is indicated upon the metrochrome scale, as is illustrated in Figure 3 of the drawings. The other color harmoniously related to the predetermined color is indicated by the primary color characters $B^3$—$R^2$, which is a compound of twenty-four parts of blue with ten parts of red. These proportions are obtained similar to the manner above described, by multiplying the metrochrome value of the respective colors by their respective exponents. Thus the metrochrome value of blue is 8 and by multiplying it by its exponent 3 we obtain 24 parts of blue. The metrochrome value of red is 5 and multiplying it by its exponent 2 the proper proportion of 10 parts of red is obtained, giving this last mentioned harmoniously related color a metrochrome value of thirty-four.

Referring to the structural features of the chart as is illustrated in Figures 1 and 2, the circular disc 35 may be pivotally mounted upon a central pin 90 extending therethrough; and in superposed relation upon a base disc 91 of greater diameter, and likewise concentrically pivoted upon the pin 90. The metrochrome scale is, as above mentioned, disposed at the outer circumference of the disc 35, while the harmonic scale 80 is contained at the outer exposed circumferential portion of the base disc 91. The pin 90 below the base disc 91 preferably has a flanged portion 92, while at the top of the pin 90 an adjustable nut 93 may be positioned; this nut 93 preferably having the upper surface thereof as depicting the area 50 which is to receive the neutral product of harmoniously related colors.

Figure 4:
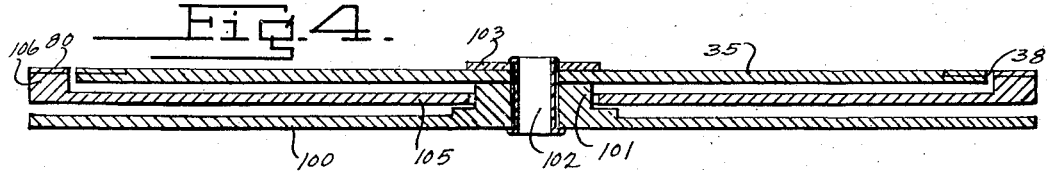
Fig. 4 is a cross sectional view taken through the chart illustrated in Figure 3, showing certain structural features which principally differ this chart from the chart illustrated in Figure 1.

Referring to the structural features of the color chart as is illustrated in Figures 3 and 4, a base support 100 may be provided, which may be circular in formation, having a hub structure 101 centrally thereof through which a hollow eyelet 102 is provided. Upon the top of the hub 101, the circular disc 35 above described, may be rotatably carried by the hollow eyelet 102; a retaining washer 103 being held by the hollow eyelet 102 in overlying relation upon the disc 35, at the area 50 above described. Pivotally mounted about the hub structure 101, between the color disc 35 and the base 100, is positioned a disc 105, which is of greater diameter than the disc 35, and which at its outer circumference is provided with an annular raised portion 106, which extends upwardly about the periphery of the color disc 35, and has thereupon the harmonic scale 80 lying in a plane flush with the plane in which the metrochome scale is positioned.

In addition to the above novel features the colors are so arranged upon the chart as to bring out the psychological characteristics thereof, and the relation of these colors with respect to such psychological characteristics. As is well known, and has been previously mentioned, there are certain colors which seem to advance toward an observer, and other colors which seem to recede from an observer. The advancing colors have been depicted upon one half of the face of the color chart, while the receding colors are depicted upon the opposite half. The reference character $A^c$, which appears in the area 42 for the primary color yellow, designates the half of the disc in which the advancing colors are disposed, while diametrically opposed in the area 47 designating the secondary color purple, is disposed the reference character R$^c$, which represents the half of the disc in which the receding colors are disposed.

It is also well known that certain colors appear to be warm or hot, while other colors give cool or cold effects. The colors upon the chart have also been arranged in this respect, so that the colors on one half of the disc 35 designates hot or warm colors, while the opposite half designates cool or cold colors. The reference character H$^t$ has been placed in the color area 45 containing the secondary color orange to designate that half of the disc 35 in which the warm or hot colors appear, while diametrically opposite, in the color area 40 in which is disposed the primary color blue the reference character C$^d$ is disposed, which designates the half of the color disc 35 in which the cold or cool colors appear.

The transient colors of refracted light, and also light itself, may be regarded as oxides of hydrogen produced by a species of combustion attended by heat, as in the sunbeam and prismatic spectrum. So also are in inherent colors of solids and liquids to be regarded upon the same analogy as oxides of hydrogen. They are attractive or repulsive of hydrogen and oxygen, of either or both of them, or they are neutral. Inferior degrees of oxidizement produce such colors as black, blue, green, purple, and higher degrees of oxidizement produce such colors as red, yellow, orange, white, and so forth.

As an example, at the base of a flame, in which the hydrogen abounds, there are colors tending to blue, and towards the apex of the flame where it is more oxygenated the colors run from red into orange and yellow. The orange colored light bears the greatest amount of actual heat, and the blue light the least amount of heat. Therefore, in pigment colors also the blues are the cool colors and the orange and yellow the warmest in effect.

All colors that contain yellow and red are warm colors; the degree of warmth depending, of course, upon the relative proportions of the warm combination. On the color chart all colors that lie on the hot or orange side of a diametered line extending half-way between the yellow and green and red and purple are to be classed as warm colors, and in similar manner all colors that lie on the opposite side of this diametered line are cold colors.

The improved color chart also indicates at a glance the relation of colored shadows to colored light, thus, by way of example, if an opaque object is placed in the beam of a yellow light, the shadow cast by the yellow light would be purple, which as indicated on the color chart is diametrically opposed to yellow. This relation for all of the colors is true; the color of the shadows which will be cast being disposed diametrically opposed to the color of the light which is thrown to produce the shadow.

In connection with the mixture of pigments the values indicated by the metrochrome proportion scale may refer to quantity, such as quarts, square yards, or other measure. While in this specification it has been mentioned that the resultant product of the harmonious color scheme will be neutral grey, yet it will be understood by those skilled in the art, that in connection with the metrochrome, instead of a neutral grey, a transparent light will be produced.

In connection with the use of the harmonic scale, it is understood that the user by setting such scale at any hue may readily determine all other harmonious colors which may be associated with that hue, as they are indicated by the same triadic number which indicates the hue.

From the foregoing description of this invention it is apparent that the color chart, which may be appropriately referred to as a triadic chart, will give to a user scientifically accurate data with respect to relative proportions of colors, either when used in juxtaposition or in mixtures of pigments and the like. Such a chart will find universal use in connection with various lines of endeavor, such as in architectural, interior and exterior decoration; sign and commercial art; floriculture; landscape gardening; window decoration; chromatography; and educational instruction. It may also be used in connection with the manufacture, design, or selection of pottery work, figure ceramics; mosaics; china painting; stage settings; costumes, pageant color schemes; paint and dye manufacturing; dress making; millinery; apparel; tapestries; fabrics; wall paper; toys, and the like.

Chroma is that quality of color that enables one to distinguish a brilliant color from a dull color. In the marginal ring of the chart wherein the metrochrome values of the colors are indicated it is preferred to form segments by radial dividing lines leading from the apices of the various colored areas, such as lines 70 and 70$^a$, as illustrated in Figure 1 of the drawings. The space at one side of each of these dividing lines is colored or delineated to designate brilliant chroma and will also designate a tint of the same hue. Thus, as is illustrated in Figure 1, the letters B, C, designate brilliant chroma and in the same space T may indicate the various tints of the same hue to which brilliant chroma has been assigned. In the spaces at the opposite sides of these dividing lines, it is preferred to color or mark dull chroma or shades of each hue. Dull chroma may be indicated by D, C, and shades by S.

Complements in brilliant chroma and dull chroma of any hue, as well as complements in tints and shades of any hue are found upon the chart in the same manner as has been described for finding complements in hue.

Harmonics in brilliant and dull chroma of any hue, as well as harmonics in tints and shades of any hue, are found in the same manner as harmonics in hue, i. e., by setting the chroma, or the tint or shade subdivision at the harmonic point.

Various changes in the shape, size, and arrangement of parts may be made to the forms of invention herein shown and described, without departing from the spirit of the invention or the scope of the claims.

I claim:

1. In a color chart the combination of colors designated by their respective metrochrome values, and arranged so as to indicate their contrasts, complements, blendings, and chroma; in combination with a scale for selecting harmonic hues.

2. In a color chart the combination of a member having colors designated thereon by their respective metrochrome values and in such relation as to indicate the contrasts and complements thereof, and a movable scale triadically divided to indicate the harmonics of any color.

3. In a color scale the combination of a member having colors indicated thereon, a scale associated with said colors designating said colors according to their respective measurable unit values based upon the neutralizing proportions of said colors, and a second scale movable with respect to the first mentioned scale in cooperative relation with respect to said colors whereby chromatic equivalents and reciprocal contrasts of the colors indicated may be secured.

4. A color chart having the colors thereon so arranged or indicated that neutralizing and contrasting colors are opposed, and an adjacent scale having numbers thereon contiguous to the colors so as to indicate the chromatic equivalent proportions necessary to produce perfect harmony.

5. A color chart having the colors thereon so arranged or indicated that the primary, secondary, tertiary and quaternary colors are shown in triadic relations with their metrochrome scale values.

6. A color chart having the colors thereon so arranged or indicated that the primary, secondary, tertiary and quaternary colors are shown in triadic relations with their metrochrome scale values, and a scale of figures graduated with triadic divisions, said divisions being each sub-divided into degrees of equal parts and so arranged that the scale of metrochrome values may be moved along the adjacent scale of triadic divisions, or vice versa, whereby the readings when such movement has been effected will express the proportions of any number and variety of hues which harmonize.

7. A color scale having colors and their metrochrome scale proportions arranged or indicated thereon so as to enable the automatic selection of chromatic equivalents, reciprocal contrasts, and melodized colors.

8. A color chart having colors and their metrochrome scale proportions arranged or indicated thereon so as to enable the automatic selection of chromatic equivalents, reciprocal contrasts, and melodized colors, and a movable scale of triadic graduations sub-divided into a series of equal divisions whereby a user may select the exact proportions for mixing any number and variety of pigment or liquid hues in order to produce any number and variety of hues which harmonize, or to produce any given compound color mixture with accuracy.

9. As an article of manufacture a device for indicating the harmonic colors of any predetermined color, and a scale for determining the correct proportions in which the colors should be used to produce harmony.

10. As an article of manufacture a device to determine color schemes and proportions comprising a scale designating the metrochrome proportions of colors, and a triadically sub-divided scale cooperatively disposed with respect to the first mentioned scale.

11. In a color scale the combination of a member upon which colors are indicated and having a scale associated therewith upon which the measurable unit values of each color combination is indicated, said values being based upon the proportional value of each indicated color, as contained in white light, or arranged in such relation as to indicate complementary combinations in their individually neutralizing proportions, and a scale movably associated with said member divided into at least three equal divisions, each division being further subdivided into degrees equal to the common multiple of the ratio 8-5-3 of the three primary colors, in such manner as to enable the selection of three or more harmonic colors in neutralizing proportions by setting given degrees and color ratios in juxtaposition.

12. A color chart comprising a member having colors arranged thereon and indicated so that mediating colors which subdue without neutralizing or contrasting succeed each other side by side, and a pair of scales movable with respect to each other, one scale being a scale of measurable unit values of the respective colors indicated, and the other scale being a scale of the three harmonic proportions of the triadic neutralizing values of all color combinations indicated upon the color chart.

13. As an article of manufacture, a color chart having advancing colors disposed thereon in opposed respective relation with receding colors, and a scale numerically indicating the relative metrochrome values of the colors.

14. As an article of manufacture, a color chart having hot colors thereon disposed in opposed respective relation with cold colors, and a scale numerically indicating the relative neutralizing values of the colors.

15. A color chart comprising a member having colors of the pigment spectrum depicted thereon, and means associable with said colors for determining their harmonic relation and harmonic proportions.

16. A color chart comprising a member having colors of the pigment spectrum depicted thereon, and means associable with said colors for determining the harmonic relation and relative metrochrome scale values of both pigment and solar colors.

17. A color chart comprising a disc having the primary colors triadically arranged thereon, the secondary colors triadically arranged in alternate relation with the primary colors, and a scale associable with the colors to numerically determine their proportionate values.

18. A color chart comprising a disc having the primary colors triadically arranged thereon, the secondary colors triadically arranged in alternate relation with their primary colors, and tertiary and quaternary colors arranged in cooperative relation in an area bounded by the primary and secondary colors in combination with a metrochrome scale and a triadically divided harmonic scale, substantially as described.

19. A device of the class described comprising a disc, a triangle disposed on the disc having primary colors arranged in the apices thereof, a second triangle superposed with respect to the first mentioned triangle in reverse overlying relation having the secondary colors disposed in the apices thereof so that they are alternately arranged with the primary colors, and tertiary and quaternary colors arranged on said disc in an area between the primary and secondary colors in cooperating relation with the primary and secondary colors so that contrasting and complementary colors of the chart are arranged in diametrically opposed relation upon the disc in combination with a metrochrome scale and a triadically divided harmonic scale, substantially as described.

20. As an article of manufacture a circular disc having colors of the pigment spectrum arranged in circular relation thereabout expressing both pigment and solar color combinations, and a scale of metrochrome proportions upon said disc with the values thereof adjacent to their respective colors.

21. In a color chart the combination of a substantially circular disc, a triangle centrally disposed with respect to said disc having primary colors arranged in the apices thereof, a second triangle disposed in reverse overlying relation with the first mentioned triangle and having the secondary colors arranged in the apices thereof in alternate relation with their primary colors, a circle scribed within the overlapping area of said triangles, and means arranging compounded colors in said area so that they are disposed in contrasting and complementary relation with respect to the primary and secondary colors in combination with a metrochrome scale sliding upon an adjacent harmonic scale.

22. A color chart comprising a substantially circular disc having a substantially six pointed star arranged thereon with the primary and secondary colors in the apices thereof with the primary and secondary colors in alternate relation, and a substantially star shaped structure within said first mentioned star shaped structure having tertiary and quaternary colors disposed therein, in cooperating contrasting and complementary relation with respect to each other and with respect to the primary and secondary colors in combination with a metrochrome scale adjacent to a triadic harmonic scale, substantially as specified.

23. A color chart comprising a substantially circular disc having a substantially six pointed star arranged thereon with the primary and secondary colors in the apices thereof in alternate relation, a substantially star shaped structure within said first mentioned star shaped structure having tertiary and quaternary colors disposed therein in cooperating contrasting and complementary relation with respect to each other and with respect to the primary and secondary colors, and a scale designating the metrochrome proportions of said colors.

24. As an article of manufacture a color scale including a member with colors designated thereon arranged in complementary opposed relation with their respective metrochome scale values indicated so that the product obtained from a mixture of any directly opposed colors in proportion according to their indicated scale values will result in a neutralized product.

25. In a color scale and chart the combination of a chart portion having a six pointed star inscribed thereon with the apices successively colored red—orange—yellow—green—blue—and purple, a circular scale enclosing said six pointed star having the respective metrochrome value numbers 5-8-3-11-8-13 disposed thereon immediately adjacent to the colors of said six pointed star, and an external circular scale enclosing first mentioned circular scale and being sub-divided into three equal parts with each part subdivided into at least 32 parts, and being cooperatively arranged with the chart star and first mentioned scale whereby to enable the selection of neutralizing, contrasting, harmonizing, and complementary colors in their metrochrome values in each separate combination.

JOHN M. GOODWIN.